United States Patent [19]
Catinella et al.

[11] 3,807,682
[45] Apr. 30, 1974

[54] ACCELERATED KNOCK-OUT FOR MOLDED PARTS

[76] Inventors: Leonard M. Catinella, 4932 W. Warwick Ave., Chicago, Ill. 60641; Manford A. Knutson, 881 Cambridge, Buffalo Grove, Ill. 60090

[22] Filed: Dec. 29, 1972

[21] Appl. No.: 319,853

[52] U.S. Cl. .................... 249/68, 164/404, 425/444
[51] Int. Cl. ............................................. B28b 7/10
[58] Field of Search .......... 249/66, 67, 68; 425/444, 425/438; 164/404, 131, 132, 145, 180, 188, 190, 213, 217, 295, 344, 345, 347, 401, 406

[56] References Cited
UNITED STATES PATENTS

| | | | |
|---|---|---|---|
| 2,301,819 | 11/1942 | Sambrook | 164/404 |
| 2,425,004 | 8/1947 | Rabell | 425/444 X |
| 2,581,854 | 1/1952 | Gries | 164/131 X |
| 2,718,032 | 9/1955 | Harvey | 249/67 X |
| 3,049,759 | 8/1962 | Eberhardt | 425/438 |
| 3,572,424 | 3/1971 | Byrne | 164/347 |
| 3,581,807 | 6/1971 | Taylor | 249/66 |

*Primary Examiner*—J. Spencer Overholser
*Assistant Examiner*—John S. Brown
*Attorney, Agent, or Firm*—Olson, Trexler, Wolters, Bushnell & Fosse, Ltd.

[57] ABSTRACT

The embodiment of the invention disclosed herein is directed to an accelerated knock-out for molded parts which are formed in a plastic molding die. The knock-out includes a body portion having a fixed pivot extending therethrough and pivotally secured to a center support plate of the plastic molding die. Extending from one end of the body is a push rod which passes through a second movable mold plate of the molding die and engages the part being molded to eject the same when the mold opens. The push rod is secured to the body by means of a movable pivot so that slight transverse motion of the pivot is accomplished during pivotal movement of the body about its fixed pivot. First and second arms extend from opposite sides of the body, preferably extending toward the mold plate and a back plate for engaging such plates to cause pivotal movement of the body and linear movement of the push rod for ejecting the molded part. Positive return of the accelerated knock-out is accomplished by positive engagement of the second arm with the back plate structures of the mold die.

3 Claims, 6 Drawing Figures

PATENTED APR 30 1974 3,807,682

ACCELERATED KNOCK-OUT FOR MOLDED PARTS

BACKGROUND OF THE INVENTION

This invention relates generally to a knock-out structure for use with molding machines, and more particularly to an accelerated knock-out for use in plastic molding dies.

Forming parts by injection molding of plastic material is well known in the art and is a very important expedient for manufacturing large quantities of inexpensive parts. When forming parts by injection molding of plastic materials it is necessary to remove the part from the mold after it has cooled sufficiently to solidify. Generally several components are fashioned to form the mold die from which plastic components are made. Also the mold die may comprise one or more cavities into which plastic material is injected under high pressure so that a plurality of components can be made at a single time. The die may be a two piece or three piece structure which opens in such a manner as to allow the part or parts so formed therein to fall or to ejected into a trough or receptacle whereupon the molded part is trimmed or cleaned of excess plastic material which can be recycled in the molding process.

However, in many instances it is necessary for an operator to physically remove the part from a mold die section so that it can be trimmed of the excess material. The operation of requiring an operator to place his hands into a molding die as it is opening and closing has proven a dangerous procedure in that carelessness would sometimes result in severe injury should the molding die parts close before the operators hands are completely removed. To eliminate this possibility special safety switches and hand kick out mechanisms have been incorporated to insure that the operators hands are completely removed from between the die parts before they close. Sometimes these safety mechanisms are circumvented by external controls so that clearing or removing of plastic material from the mold can be accomplished manually. This is undoubtedly a dangerous procedure even though it is sometimes necessary.

To substantially eliminate the need of removing plastic parts from injection molding dies by hand, accelerated knock-outs have been incorporated in the die mechanism for kicking out the part at a rate faster than the opening of the die. This device is a mechanical accelerator or amplifier which insures fast removal of the part so that it will drop into a receptacle or trough beneath the die whereupon the operator can pick up the part without the need of placing hands in or near the opening die parts.

Heretofore, accelerated knock-out mechanisms have been relatively complicated in that they require many parts and return spring mechanisms to insure that the accelerator is retracted during each molding operation. This increases the cost of mold dies incorporating such accelerated knock-outs, as well as increases the complexity of the structure. Also, the increased complexity sometimes results in premature failure and extended down time of the machine, thus increasing the overall cost of the plastic parts manufactured thereby.

SUMMARY OF THE INVENTION

Accordingly, it is an object of this invention to provide an improved accelerated knock-out structure which is formed of a minimum number of parts and which is inexpensive to manufacture while at the same time being extremely reliable and efficient in operation.

Another object of this invention is to provide an improved accelerator knock-out which can be inserted directly into a plastic molding die as an integral part thereof without necessitating major changes in the die structure.

A still further object of this invention is to provide an accelerated knock-out structure which is returned quickly and positively to an initial condition solely as a result of the moving components of the die, thus eliminating the use of return springs and the like.

Many other objects, features, and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
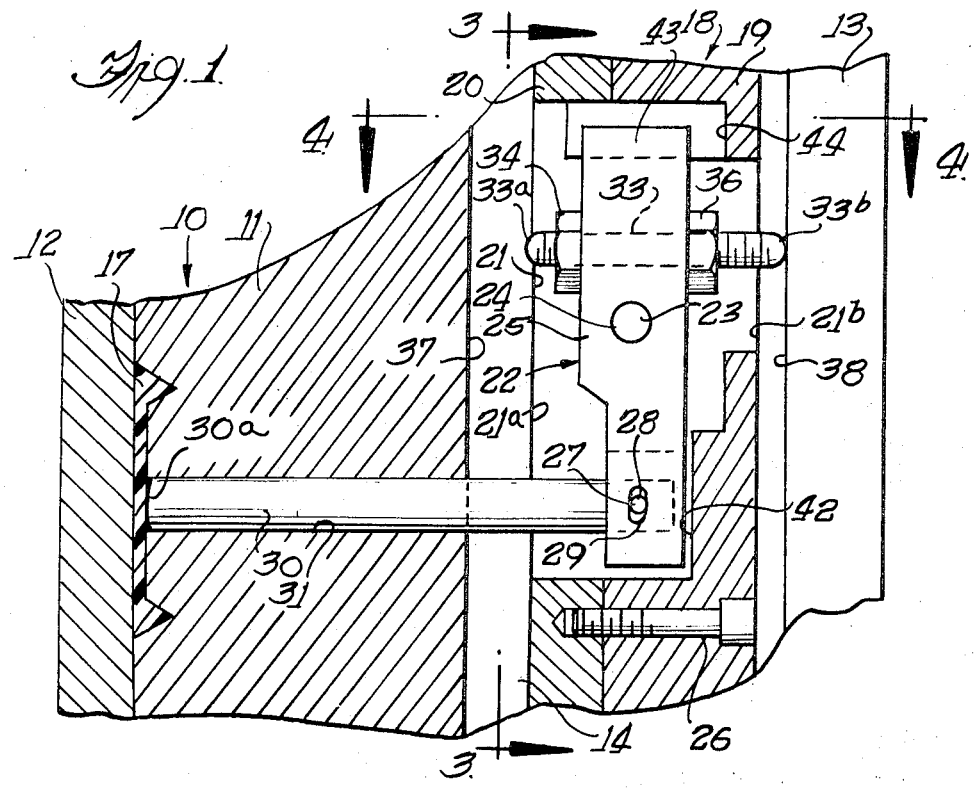
FIG. 1 is an enlarged elevational fragmentary view of an injection molding die shown in a closed position for manufacturing plastic components and wherein the accelerated knock-out of this invention is utilized.

Referring now to the drawings an injection molding die 10 comprises a movable mold block 11 which moves relative to a second mold block or cover plate 12. The cover plate 12 may be fixed or may be movable, as desired, so long as relative movement between the mold block 11 and cover plate 12 provides sufficient spacing therebetween to allow a molded part to be ejected therefrom. A back plate 13 is spaced from but secured and movable with the mold block 11, thus providing a space 14 therebetween.

Figure 2:
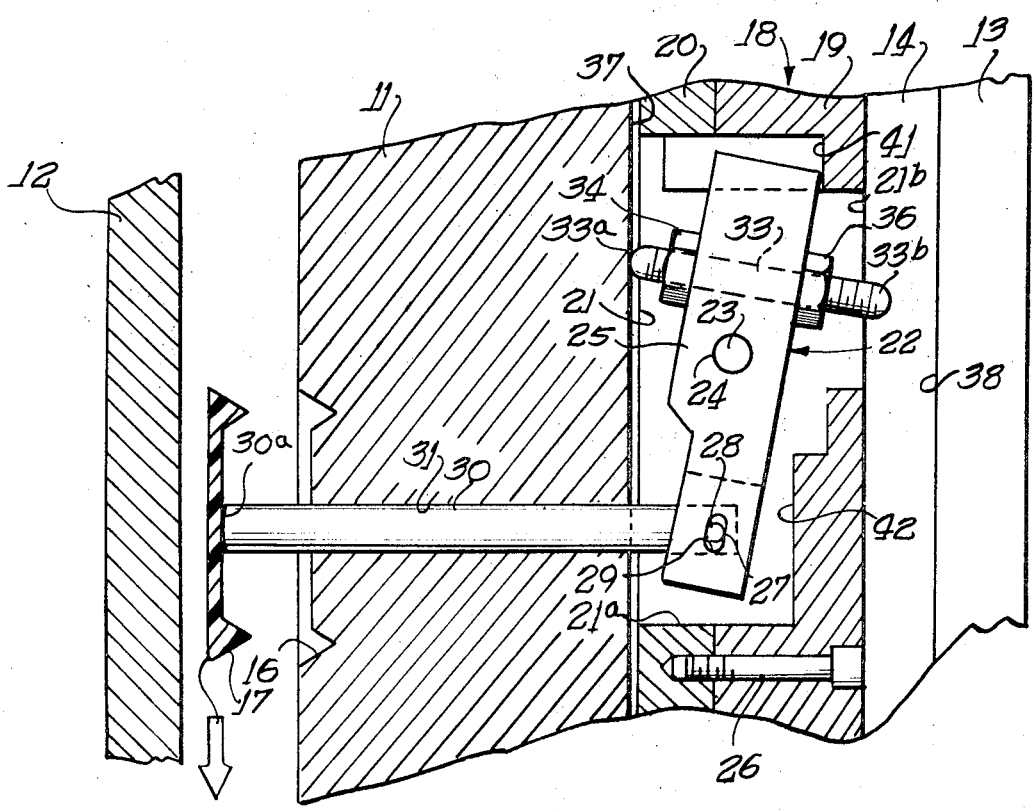
FIG. 2 is an enlarged fragmentary sectional view similar to that of FIG. 1 but showing the mold in an open condition and the accelerated knock-out engaged for removing the part formed therein.

Formed within the mold block 11 is a cavity 16 from which is formed a molded part 17, as best seen in FIGS. 1 and 2, and which may have any desired configuration other than that shown on the drawings. MOunted between the mold block 11 and the back plate 13, within the space 14, is a movable center plate 18 preferably formed by a pair of steel plates 19 and 20. Formed within the center plate 18 is an opening 21 which has an enlarged opening portion 21a formed at one end thereof and a smaller opening portion 21b formed at the other end thereof. The reduced dimension portions of the opening 21 form stop limit surfaces against which the accelerated knock-out of this invention engage to prevent over travel thereof.

Most advantageously an accelerated knock-out 22 has a main body 25 which is pivotally mounted within the center plate 18 at a pivot point 23 by means of a mounting pin 24. The mounting pin 24 may fit into a slot formed within the thicker plate 19, the slot having a given depth and the pin is held in place by the plate 20 which is secured by a plurality of screws passing therebetween. Formed at one end of the body portion 25 of the accelerated knock-out 22 is a slidable pivot point 27 which comprises a pin 28 passing through an elongated slot 29.

Extending from the slidable pivot point 27 is a push rod 30 passing through a passage 31. When the mold is in the closed position, as shown in FIG. 1, the end surface 30a of the push rod 30 is in substantial alignment with the interior surface of the cavity 17 into which the fluid plastic material is injected. In other words, the top surface 30a of the push rod 30 forms part of the mold cavity.

On the opposite side of the pivot point 23 is located a threaded stud or shaft 33 which forms extended arm portions 33a and 33b on opposite sides of the body portion 25 of the accelerated knock-out structure. To provide suitable adjustment of the ends of the arm portions lock nuts 34 and 36 are urged firmly against the body portion 25 to lock the position of the shaft. The arm portion 33a extends toward and engages with the inside surface 37 of the mold block 11 while the arm portion 33b extends toward and engages with the inside surface 38 of the back plate 13.

During operation, when the mold is in a closed position, as shown in FIG. 1, a fluid plastic material is injected into the cavity 16 to form the part 17. After a small time interval sufficient to allow solidification of the molten plastic material the mold is opened by parting the cover plate 12 and the mold block 11. This parting causes the mold block 11 to move toward the center plate 18 until such time that the inside surface 37 engages the extended arm portion 33a. This pushes the accelerated knock-out about the pivot point 23 and rapidly shifts the position of the push rod 30 so as to eject or knock out the part 17 from its cavity. Because the distance between the pivot point 23 and the axis through the threaded shaft 33 is less than the distance between the pivot point 23 and the slidable pivot point 27 a mechanical amplification is obtained thus providing a knock-out movement which is accelerated with respect to the movement of the opening of the mold block 11. Therefore the part 17 is ejected at a rate faster than is normally obtained. By providing a single unitary structure of the accelerated knock-out 22 in accordance with this invention a minimum number of components is required.

To insure proper return of the push rod 30 the arm 33b is engaged by the inside surface 38 of the back plate 13 to again pivot the body structure about the pivot point 23. This rapidly pulls the push rod back to its neutral position.

Figure 3:
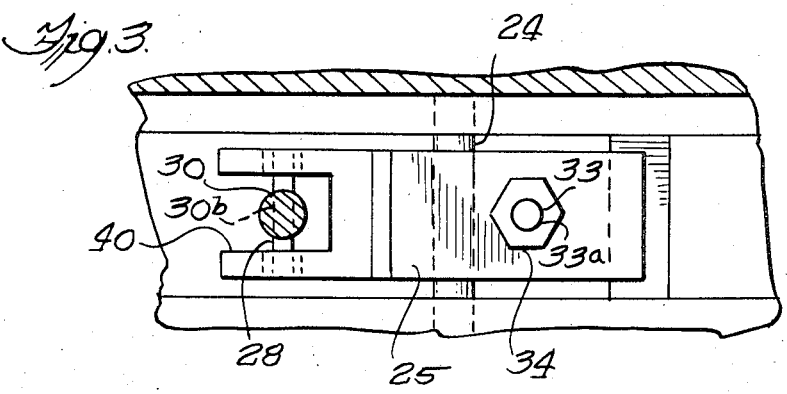
FIG. 3 is a plan view of the accelerated knock-out secured into a movable plate of the die structure of FIGS. 1 and 2.
Figure 4:
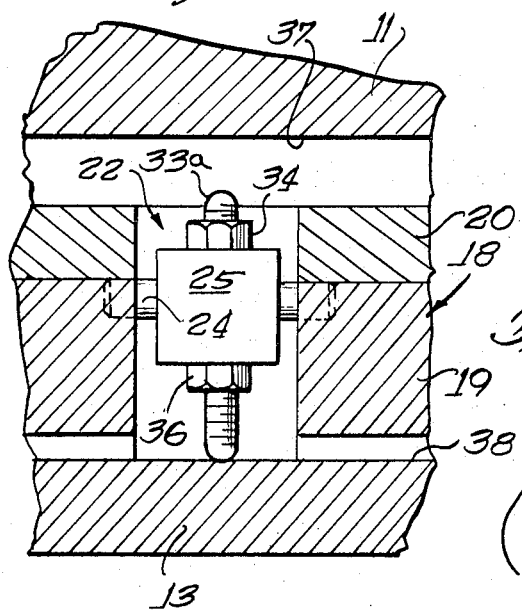
FIG. 4 is a side view of the structure of FIG. 3.

As seen more clearly in FIG. 3 the end portion of the body receiving the push rod 30 is provided with a U-shaped cutout section 40 for receiving the lower end of the push rod therein. To prevent over travel of the accelerated knock-out about its pivot point 23 a stop surface 41 is formed at one end of the opening 21 and a stop surface 42 is formed at the other end of the opening 21. Therefore, the end 43 of the accelerated knock-out will engage the stop member 41, shown in FIG. 2, when the mold cavity is in an opened condition and the push rod 30 is extended to its accelerated ejected position. On the other hand, when the mold is in its closed position the body portion of the accelerated knock-out 22 engages the stop surface 42 and ove travel of the body 25 about the pivot point 23 is limited. No springs or other return mechanisms are needed for proper operation of the accelerated knock-out as constructed in accordance with this invention.

Figure 5:
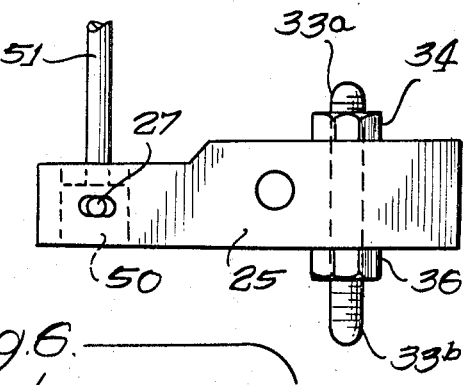
FIG. 5 is an enlarged side view of the accelerated knock-out of this invention and further showing an adaptor unit for receiving relatively small diameter ejector rods.
Figure 6:
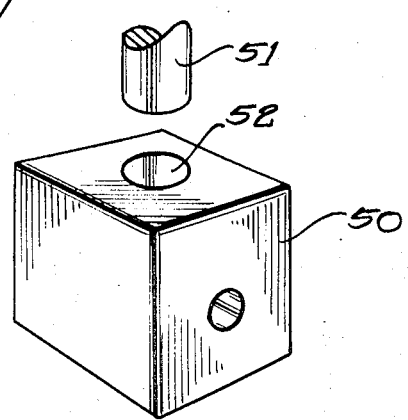
FIG. 6 is an exploded perspective view showing the adaptor unit and small diameter ejector rod as utilized in FIG. 5.

Referring now to FIG. 5 and FIG. 6 a modification of the present invention is shown. An adaptor unit 50 is shown secured to the slidable pivot point 27 so that a substantially reduced diameter push rod 51 can be utilized. This is more clearly illustrated in FIG. 6 which shows the small diameter push rod 51 adapted to be inserted into a blind hole 52 and permanently secured to the adaptor 50 by such means as silver soldering or the like. This is particularly useful when the diameter of the push rod 51 is such that a transverse hold can not be formed therein to receive the pin 28.

From the foregoing detailed description it will be understood that other variations and modifications of this invention may be effected without departing from the spirit and scope of the novel concepts as disclosed and claimed herein.

We claim:

1. A molding die comprising, a first mold plate, a second mold plate movable relative to said first mold plate, a mold cavity formed between said first and second mold plates, a back plate spaced from but movable with said second mold plate, said second mold plate and said back plate having facing inside surfaces, a center plate positioned between said second mold plate and said back plate, said center plate having an opening formed therein, an accelerated knock-out structure mounted within the opening of said center plate and extending through said second mold plate for ejecting parts formed in the cavity, said accelerated knock-out structure including a body, a first pivot means extending through said body intermediate the ends thereof for pivotally securing the body at a fixed point within said opening of said center plate, a push rod pivotally connected to one end of said body and extending through said second mold plate, said push rod being pivoted in such a manner as to provide a moving pivot point, first arm means extending from said body for engaging the inside surface of said second mold plate while moving in one direction for causing accelerated movement of said push rod toward the part formed within said cavity for ejecting the same, and second arm means extending from said body for engaging the inside surface of said back plate when moving in the opposite direction for returning said body and said push rod to its initial condition so that subsequent parts can be molded.

2. The molding die according to claim 1, wherein said first and second arm means are threaded studs extending from said body and threadedly receiving a lock nut for locking the position of said stud, whereby adjustment of the position of the stud relative to said second mold plate and said back plate is easily accomplished.

3. The molding die according to claim 1, further including adaptor means, said adaptor means arranged for receiving said push rod and being pivotally connected to said body by said movable pivot.

* * * * *